(12) United States Patent
Acatrinei et al.

(10) Patent No.: US 6,465,990 B2
(45) Date of Patent: Oct. 15, 2002

(54) POWER FACTOR CORRECTION CIRCUIT

(75) Inventors: Beniamin Acatrinei, San Jose; Ronald A. Lesea, Redwood City, both of CA (US)

(73) Assignee: Bensys Corporation, Sunnyvale, CA (US)

( * ) Notice: Subject to any disclaimer, the term of this patent is extended or adjusted under 35 U.S.C. 154(b) by 0 days.

(21) Appl. No.: 09/810,807

(22) Filed: Mar. 15, 2001

(65) Prior Publication Data

US 2002/0130640 A1 Sep. 19, 2002

(51) Int. Cl.[7] .................... G05F 1/652; H02M 1/12
(52) U.S. Cl. .................................. 323/222; 363/40
(58) Field of Search ........................... 323/222, 282, 323/284, 283, 285; 363/21.01, 127, 131

(56) References Cited

U.S. PATENT DOCUMENTS

| | | |
|---|---|---|
| 4,719,552 A | 1/1988 | Albach et al. |
| 5,134,355 A | 7/1992 | Hastings |
| 5,181,159 A | 1/1993 | Peterson et al. |
| 5,283,727 A | 2/1994 | Kheraluwala et al. |
| 5,359,276 A | 10/1994 | Mammano |
| 5,359,277 A | 10/1994 | Cowett |
| 5,406,192 A | 4/1995 | Vinciarelli |
| 5,426,579 A | 6/1995 | Paul et al. |
| 5,568,041 A * | 10/1996 | Hesterman ............... 323/207 |
| 5,592,128 A | 1/1997 | Hwang |
| 5,644,214 A | 7/1997 | Lee |
| 5,742,151 A | 4/1998 | Hwang |
| 5,757,166 A | 5/1998 | Sodhi |
| 5,804,950 A | 9/1998 | Hwang et al. |
| 5,815,386 A * | 9/1998 | Gordon ................ 363/50 |
| 5,867,374 A | 2/1999 | Moreau |
| 5,910,891 A | 6/1999 | Jo |
| 5,912,549 A | 6/1999 | Farrington et al. |

OTHER PUBLICATIONS

A. Abramovitz, et al., "A Resonant Power Factor Conditioner," 1993, Department of Electrical and Computer Engineering, Ben–Gurion University of the Negev, Israel No Date Available.

V. Belaguli, et al., "Characteristics of a fixed–frequency series–parallel resonant converter operating on the utility line with and without active control," Can. J. Elect. & Comp. Eng., vol. 23, No. 4, Oct. 1998.

W. Chen, et al., "An Improved 'Charge Pump' Electronic Ballast with Low THD and Low Crest Factor," IEEE Transactions on Power Electronics, vol. 12, No. 5, Sep. 1997.

U.S. patent application, 5,528,126, filed Jun. 1996, Wagoner (withdrawn).

J. Cho, et al., "Novel Zero–Voltage–Transition Isolated PWM Boost Converter for Single Stage Power Factor Correction," 1998, Power Electronics Research Division, Korea Electrotechnology Research Institute, Korea No Date.

J. Goren, et al., "Single–Stage Series Resonant Power Factor Correctors," 1996, Gamatronic Electronic Industries Ltd., Israel No Date.

(List continued on next page.)

Primary Examiner—Rajnikant B. Patel
(74) Attorney, Agent, or Firm—Fish & Richardson P.C.

(57) ABSTRACT

A Parallel Charge, Series Discharge method and apparatus for power factor correction and improved efficiency comprising an energy source, two (or more) impedance(s) capable of storing and delivering electrical energy, a switching circuit having one position so that inpedance(s) charge in a parallel mode with a fraction of the electrical energy incoming from one (or more) rectified AC input generator (s), and another position so that inpedance(s) discharge some of the electrical energy stored into the load, the switch having a frequency and duty cycle so that the input current rectified waveform from the energy source will approximate the voltage rectified waveform from the energy source.

20 Claims, 6 Drawing Sheets

OTHER PUBLICATIONS

S. Hui, et al., "A Fully Soft–Switched Extended–Period Quasi–Resonant Power–Factor–Correction Circuit," IEEE Transactions on Power Electronics, vol. 12, No. 5, Sep. 1997.

R. Liu, et al., "Design of High Frequency Resonant Power Factor Correction Circuits Via Input Current Programmed Control Schemes," 1992, Phillips Labs., Briarcliff Manor, NY No Date.

R. Liu, et al., "Resonant Power Factor Correction Circuits With Resonant Capacitor–Voltage and Inductor–Current–Programmed Controls," 1993, Phillips Laboratories, Briarcliff Manor, NY No Date.

R. Liu, et al., "A Unified Approach to the Design of Resonant Power Factor Correction Circuits," No Date 1992, Department of Electrical Engineering and Computer Science, University of Illinois at Chicago.

Y. Chang, et al., "Analysis and control of a novel soft–switched isolated boost converter," Int. J. Electronics, 1998, vol. 85, No. 1 No Date.

Y. Jang, et al., "New Single–Switch Three–Phase High–Power–Factor Rectifiers Using Multiresconant Zero–Current Switching," IEEE Transactions on Power Electronics, vol. 13, No. 1, Jan. 1998.

V. Murali, et al., "Comparison of Small–Signal Dynamics of BIFRED and Single–Stage Cascaded Boost–and–Flyback PFC Converters," 1998, Department of Electronic Engineering, Hong Kong Polytechnic University, Hong Kong No Date.

A Pietkiewicz, et al., "Single–Stage Power–Factor–Corrected Rectifier Topology," 1999, Ascom Energy Systems, Berne, Switzerland No Date.

H. Pinheiro, et al., "Self–Oscillating Resonant AC/DC Converter Topology for Input Power–Factor Correction," IEEE Transactions on Industrial Electronics, vol. 46, No. 4, Aug. 1999.

J. Qian, et al., "Analysis, Design, and Experiments of a High–Power–Factor Electronic Ballast," IEEE Transactions on Industry Applications, vol. 34, No. 3, May/Jun. 1998.

J. Qian, et al., "Analysis and Pspice Simulation of Family of Resonant Power Factor Correction No Date Circuits," Electrical and Computer Engineering Department, University of Central Florida, Florida.

J. Qian, et al., "New Charge Pump Power–Factor–Correction Electronic Ballast with a Wide Range of Line Input Voltage,"IEEE Transactions on Power Electronics, vol. 14, No. 1, Jan. 1999.

J. Qian, et al., "A Single–Stage Electronic Ballast with Power Factor Correction and Low Crest Factor for Fluorescent Lamps," 1997, Matsushita Electric Works (MEW) R&D Laboratory, Woburn, MA No Date.

J. Qian, et al., "Current Source Charge Pump Power Factor Correction Electronics Ballast," 1997, Matsushita Electric Works, R&D Laboratory, Woburn, MA No Date.

J. Sebastián, et al., "Quasi–Resonant Power Factor Preregulators," IEEE Transactions on Power Electronics, vol. 13, No. 4, 1998 No Date.

C. Tse, et al., "New Single–Stage Power–Factor–Corrected Regulators Operating in Discontinuous Capacitor Voltage Mode," 1997, Department of Electronic Engineering, Hong Kong Polytechnic University, Hong Kong No Date.

Z. Yang, et al., "Recent Developments in High Power Factor Switch–mode Converters," 1998, Department of Electrical and Computer Engineering, Queen's University, Kingston, Ontario, Canada No Date.

R. Cheng, et al., "A Quasi–Resonant Power Factor Correction Converter," 1997 IEEE International Symposium on Circuits and Systems, Jun. 9–12, 1997, Hong Kong.

* cited by examiner

Fig. 1: Prior Art

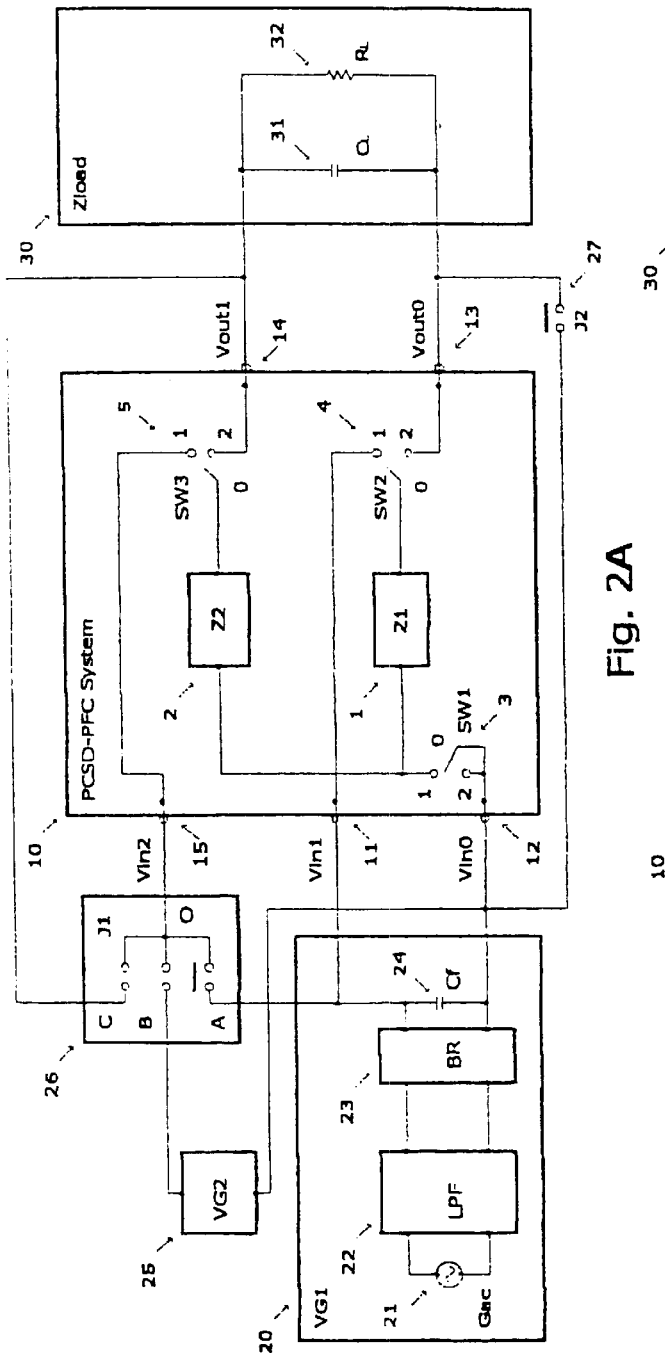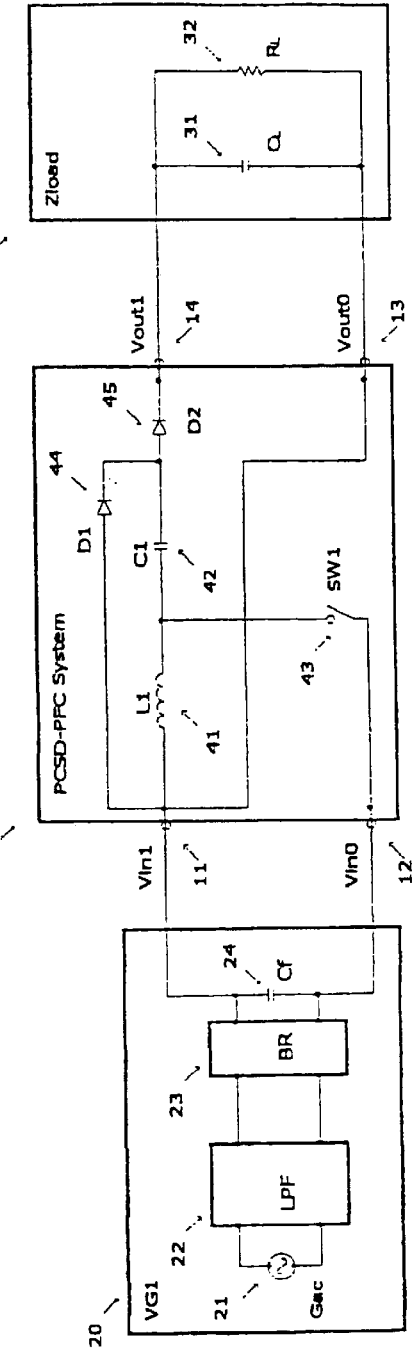
Fig. 2A
Fig. 2B

Fig. 3B

| # | Description | # | Description | # | Description |
|---|---|---|---|---|---|
| 31 | Cload – 100uF/400v | 71 | Gac – 120v/60Hz | 80 | Gps=Pulse Generator* |
| 32 | Rload – 570 ohms/250w | 72 | Cf1 – 220nF/250v | 84 | IC1 – 555 Timer |
| 41 | L1 – 176uH | 73 | Lf – 2 x 12mH | 85 | Rg1 – 750 ohms |
| 42 | C1 – 10nF/500v | 74 | Cf2 – 220nF/250v | 86 | Rg2 – 12 k ohms |
| 44 | D1 – 2A/500v-fast | 75 | BR – 3A/400v | 87 | Rg3 – 10 ohms |
| 45 | D2 – 2A/500v-fast | 76 | Cf3 – 220nF/250v | 88 | Cg1 – 680pF |
| 46 | Q1 – IRF740 | | | 89 | Cg2 – 10nF |
| 47 | L2 – 8.8uH | | | | |
| 48 | D3 – 2A/500v-fast | | | | |
| 49 | C2 – 220pF/500v | | | | |

* – This classic 555 astable circuit provides 16v square wave (T= 14.2uS, Ton=7.4us, Toff=6.8uS)

POWER FACTOR CORRECTION CIRCUIT

TECHNICAL FIELD

This invention relates to an active Power Factor Correction ("PFC") circuit. More particularly, the present invention describes several methods and an apparatus for supporting a Parallel Charge, Series discharge ("PCSD") system, to be used in a Power Factor Correction process between a generator and a load, which includes reactive components.

BACKGROUND

In the process of transferring AC electrical power from a generator to a load, in addition to the efficiency, the power factor is a very important parameter. The Efficiency ($\eta$) is technically the ratio of Output Power (measured in Watts) to the consumed Input Power (measured also in Watts) and often expressed as a percentage (0 to 100%).

$$\eta(\%)=100\times\text{Output Power }(W)/\text{Input Power }(W); 0\%<\eta<100\%$$

This above expression illustrates that the Efficiency ($\eta$) of an electrical system is determined only by the parameters of Output Power and Input Power. The ideal efficiency is 100%, meaning there is absolutely no loss in the generator-load circuit. In real AC/DC converter situations, the efficiency is often as low as 60%. In the most modem designs, by using new system architectures and suitable parts, converters with efficiencies of greater than 95% are possible.

Power Factor ("PF") is traditionally known as the cosine of the phase difference between a sinusoidal source voltage and the corresponding load current waveform. In fact, this thinking is only valid when the input current waveform is sinusoidal. For the general case and valid for all situations, PF is the ratio of Real Input Power consumed to Apparent Input Power and is expressed as a decimal fraction between 0 and 1. The Real Power (in some other publications may be called "True Power", "Average Power" or "RAM Watts (sic) Power") is measured in Watts (W) and the amount is equal to the time integral of the input voltage and input current product. The Apparent Power is measured in Volt-Amperes (VA) and the amount is equal to the product of the rms input voltage and the rms input current.

$$PF=\text{Real Input Power }(W)/\text{Apparent Input Power }(VA); 0<PF (W/VA)<1.$$

This above expression shows that the PF of an electrical system refers only to characteristics of the Input Power. Since the Output Power is not involved in the PF expression, a low Power Factor is not necessarily related to low efficiency, but rather with a low utilization of the Apparent Input Power. The ideal value for the Power Factor is PF=1, which means that the Real Input Power is equal in amount to the Apparent Input Power. This happens only when the entire load circuit is purely resistive, because resistors do not change the current phase or current shape from the source voltage. For example, for a simple AC generator-resistive load circuit (FIG. 1A), the shape and phase of the current waveform of the generator's circuit (FIG. 5B) is identical to the shape and phase of the voltage waveform generated into the circuit (FIG. 5A), assuming the voltage drop of the bridge rectifier is negligible. For this case the Real Input Power is equal to the Apparent Input Power, so PF=1.

However, when the load is non-linear, time varying, or contains reactive elements (e.g., capacitors and inductors), the current waveform in the generator's circuit becomes very different in shape and/or phase than the voltage waveform and PF decreases. In the "bridge rectifier-bulk capacitor" case (FIG. 1B), the capacitor Cload acts a storage device (exactly the desired filtering function), keeping the DC voltage across the load close to the peak of the rectified input voltage. This means that the capacitor charges only for a small part of the AC cycle, i.e., the capacitor only charges during the time when the AC peak voltage (minus the small voltage lost on the bridge rectifier) exceeds the instantaneous capacitor voltage. The capacitor stops charging just as the AC voltage reaches its maximum peak value, because after that moment, there is no more current through the rectifier bridge (as long the load's voltage is higher than the generator's voltage, BR's diodes are reverse-biased). This results in a current pulse lasting typically for only 1 or 2 mS of the 8.33 mS half cycle (based on a 60 Hz source). This pulse waveform (see FIG. 5C) is a dramatically different shape from the incoming sine wave voltage and many harmonics are created in the current's waveform spectrum. Since only the fundamental 60 Hz component of the current can contribute to the Real Power, the current from each harmonic increases the Apparent Power amount. This also increases THD (Total Harmonic Distortion), typically to over 100%, and decreases the PF down to typically less than 0.65. Thus, the rms input current is higher than otherwise necessary, so the electrical utilities need to have more generating and distributing capacity. In addition, because the impedance of the power lines and distribution transformers is not zero, the harmonic currents distort the voltage waveform and can cause problems with other equipment.

Virtually all existing electrical devices supplied from AC power sources have Power Factors less than 1.0 (with the obvious exception of pure resistive loads, such as heating devices and incandescent lamps). Because of the problems that low PF creates, PF correction is desirable for a wide range of electrical devices. However, the extra cost and complexity of the PF circuit have to be weighed against the advantages of improved PF. Also, in a given system, by attaching a PF circuit, the overall efficiency of the entire system will almost always decrease due to the less than 100% efficiency of the PF circuit itself. (Exceptions exist for cases where the addition of PF Correction enables improved efficiency in the rest of the system, by increasing the internal DC operating voltage or by other effects.) Therefore, PF, Harmonic Distortion, cost and efficiency are the most important parameters of a PFC circuit.

Presently, worldwide, the number of electrical devices containing internal electronic circuits (such as computers, TV sets and computer monitors, stereos, industrial equipment, telecommunication equipment, etc.) is increasing dramatically every day. These devices require an internal DC voltage supply, obtained by converting the AC current available from the AC power line. Often a simple circuit like the one illustrated in FIG. 1B is used for this AC to DC conversion. Therefore, there is a worldwide need to resolve low PF issues efficiently and cost effectively. As an example of the seriousness of the problems caused by low PF equipment, Japan and the European Union have set standards for PF and Harmonic Distortion. These standards cover a wide variety of electrical devices.

Although there are methods to increase PF and lower THD using passive components (inductors and capacitors), generally the size and cost of the passive components is prohibitive for most common electronic equipment. Considerable effort has been expended over the last 15 years to develop so-called active methods of power factor correction.

FIG. 1C illustrates the core of most classic active PFC systems and contains an inductor, L, a switching diode, D, and an electronic switch, SW. Four terminals, Vin0, Vin1, Vout0, and Vout1 connect this block to the external circuit. Commonly, an AC voltage generator, Gac, provides energy to the system through a Low Pass Filter, LPF, and a bridge rectifier, BR. (The purpose of LPF is to reduce substantially the amount of electrical high frequency noise generated in the PFC circuit that appears as high frequency currents in Gac.) The unfiltered full-wave rectified output from BR appears with the positive pole at Vin1 with respect to Vin0. A continuous series of high frequency pulses is delivered through D to the reactive load, Zload, that includes a resistive load and a large value bulk storage capacitor. The polarity is positive at Vout1 with respect to Vout0. The electronic switch SW (usually a power MOSFET) switches OFF and ON at a relatively high frequency. While SW is ON there is a path for current from BR through L. The current in L increases until SW is OFF. At this point, some (if not all) of the energy stored in L will be delivered to Zload in a discharge circuit which includes L, D and Cf (BR and LPF also include a part of -the load current in parallel to Cf). The ON and OFF times of SW, together with an appropriate value for L, can be arranged to force the input current waveform shape (FIG. 5D) to be very close to the voltage waveform (FIG. 5A), despite the large value capacitor included in Zload.

FIG. 1D illustrates the core of a classic PFC circuit schematic diagram, which provides more circuit details. A common active PFC circuit contains an inductor, L, a switching diode, D, a power MOSFET, Q, a switching controller, SC, a current sense resistor, Rs, and a voltage sense divider, R1 and R2. The switching controller, SC, provides the gate of MOSFET Q, with a PWM (Pulse Width Modulated) signal with proper ON-OFF times. This gate signal must be properly related to the instantaneous amplitude of the input voltage at Vin1 (with respect to Vin0) and with L and ZL currents. Therefore, SC must have at least a current sense input, Is, and sometimes a voltage sense input, Vs. Usually SC also has an input, Vos, for use in regulating the output voltage and some other inputs (not specified here). A classic PFC controller IC has, typically, 8 to 16 terminals.

Similar to FIG. 1C, FIG. 1D classic PFC circuit has four terminals, Vin0, Vin1, Vout0, and Vout1, that connect the PFC block to the external circuit. Commonly, an AC voltage generator, Gac, provides energy to the system through a thermistor, Th, with a first filtering capacitor, Cf1, a filtering inductor, Lf, a second filtering capacitor, Cf2, a bridge rectifier, BR, and a third filtering capacitor, Cf3. The full-wave rectified output from BR appears with the positive pole at Vin1 with respect to Vin0.

A continuous series of high frequency pulses is delivered through D to the reactive load, Zload, which includes a resistive load, Rload, and a large value capacitor, Cload. The polarity is positive at Vout1 with respect to Vout0. Until it is fully charged after first turn-on, the load capacitor, Cload, will absorb a high current from the Gac generator (inrush current). In order to reduce this initial current surge, the thermistor, Th, limits, for a short time, the current in the entire circuit, by having large electrical resistance when it is cold (room temperature) and relatively small electrical resistance at high temperature. Upon first turn-on, Th self-heats due to the initial current and the consequent circuit current and stays hot (low resistance) during normal operation. When Th is hot, the capacitor, Cload, is already fully charged and the input circuit current is basically the average of the inductor, L, current. In order for the generator, Gac, current waveform to follow its sine wave voltage waveform, SC must deliver appropriately timed ON and OFF high frequency pulses to the gate of MOSFET Q. By sensing continuously the input circuit current (sometimes along with the input voltage), the controller SC is able to provide properly timed ON-OFF pulses for a good power factor and low THD. This circuit is able to improve the power factor to over 0.95 with low THD, but despite using a complex (and expensive) controller IC, the efficiency is normally less than 90%. Other disadvantages are a relatively large value of the switching inductor (about 1 mH) which increases the loss of energy and the cost, RFI/EMI problems due to square wave voltages across MOSFET Q, high switching losses in MOSFET Q, and, in some designs, high switching losses in D. High switching losses in Q and D require a cost penalty for large heat sinks and of course, the efficiency is reduced due to the switching losses. An important limitation of this classic circuit (sometimes referred to as a "boost" circuit) is that the output DC voltage must be higher than the input peak voltage in order to provide good PF.

Therefore, in a situation where the input rms voltage can be (temporarily) as high as 260V (European nominal 240V), the peak input voltage becomes 260V×1.414=368V, the output DC voltage must be higher than 370V. Commonly, PFC circuit designers provide a DC output of more than 380V for 240VAC applications.

Therefore, a need exists for a PFC circuit that is cost effective and efficient, does not need a sophisticated switch control circuit, is able to use a smaller inductor for a given output power, does not need a thermistor (or any other protection system) for the inrush current, and is able to provide an output voltage either higher or lower than the peak input voltage, with good PF and low Harmonic Distortion.

SUMMARY

Accordingly, the present invention is directed to a Parallel Charge Series Discharge Power Factor Correction ("PCSD-PFC") circuit, including system, methods, and apparatus, that addresses many of the problems due to limitations and disadvantages of the related art.

The internal structure of the PCSD-PFC (10) circuitry may include five principal functional blocks: a first impedance circuit Z1 (1), a second impedance circuit Z2 (2), a first switch S1 (3), a second switch S2 (4), and a third switch S3 (5), as shown in FIG. 2A.

The generic PCSD-PFC (10) invention may include four distinct in/out terminals, and other embodiments, having less or more than four terminals, representing particular variations and are based on the same method and principles. The basic terminals are Vin0 (12), Vin1 (11), Vout0 (13), Vout1 (14). These four in/out terminals may be used separately and/or simultaneously.

It is an object of the present invention to provide a new technique of improving the PF in an electrical circuit, by the means of a Parallel Charge Series Discharge (PCSD) system, which includes at least two devices, e.g. a capacitive and an inductive circuit, able to store energy and charging/discharging switching circuitry.

It is still another object of the present invention to provide several methods of controlling the PCSD system that improve the PF during the transfer of the electrical energy between one (or more) AC electrical generator(s) and one (or more) reactive and/or non-linear load(s) by charging, in a parallel circuit, a fraction of the incoming electrical energy into two (or more) device(s) able to store electrical energy, and then to discharge the two (or more) device(s), coupled in a series circuit this time, into one (or more) reactive load(s).

It is another object of the present invention to provide a new circuit architecture that is efficient, and is able to reduce substantially the dimensions and/or cost of a PFC circuit through the use of a PCSD electronic switching system.

It is also another object of the present invention to provide an "AC generator-bulk capacitor" apparatus that not only is a PF corrector but also includes a complete power supply unit, incorporating an internal PCSD system.

To achieve these and other advantages, and in accordance with the purpose of the present invention, as embodied and broadly described herein, the present invention is a Parallel Charge Series Discharge ("PCSD") system, apparatus and method. One embodiment of the PCSD circuit comprises: an electrical power source, a first impedance for charging and storing a fraction of the electrical energy incoming from the electrical power source, a second impedance for charging and storing a fraction of the electrical energy incoming from the same or a different electrical power source, at least one switch having at least a first switch position for charging in a parallel circuit said first and second impedances, and at least a second switch position for discharging in a series circuit said first and second impedances into one or more reactive loads.

The invention exists in the novel parts, constructions, arrangements, combinations and improvements herein shown and described. The above stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto. Additionally, it will be understood that both the foregoing general description and the following detailed description are exemplary and explanatory only and are not restrictive of the invention as claimed.

The details of one or more embodiments of the invention are set forth in the accompanying drawings and the description below. Other features, objects, and advantages of the invention will be apparent from the description and drawings, and from the claims. The accompanying drawings are included to provide a further understanding of the invention and are incorporated in and constitute a part of this specification. In addition, the accompanying drawings illustrate the embodiments of the invention and, separately as well as together with the description, serve to explain the principles of the invention.

DESCRIPTION OF DRAWINGS

FIG. 2A is a PCSD-PFC block diagram in accordance with the present invention.

FIG. 2B is a schematic diagram representing an embodiment of the present invention.

FIG. 3B is the parts list for the circuit of FIG. 3A.

Like reference numbers and designations in the various drawings refer to like elements.

DETAILED DESCRIPTION

Figure 1A:
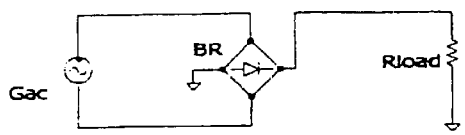
FIG. 1A is a classic unfiltered DC power supply circuit.
Figure 1B:
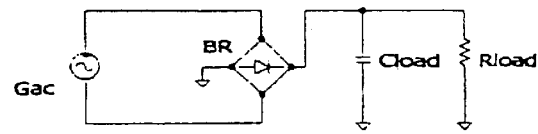
FIG. 1B is a classic, bulk capacitor filtered, DC power supply circuit.
Figure 1C:
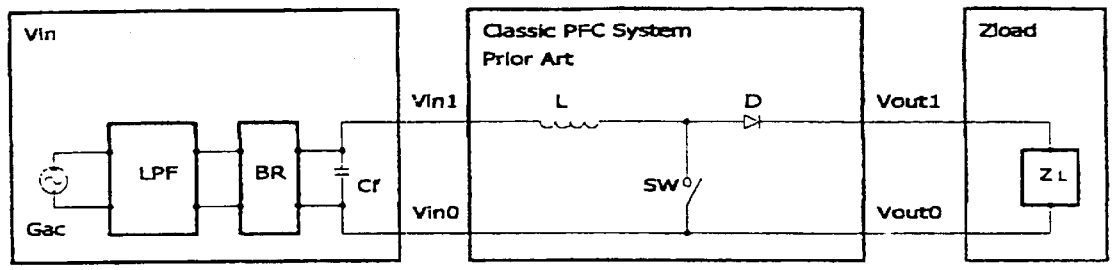
FIG. 1C is a generic schematic diagram representative of a prior art active PFC.
Figure 1D:
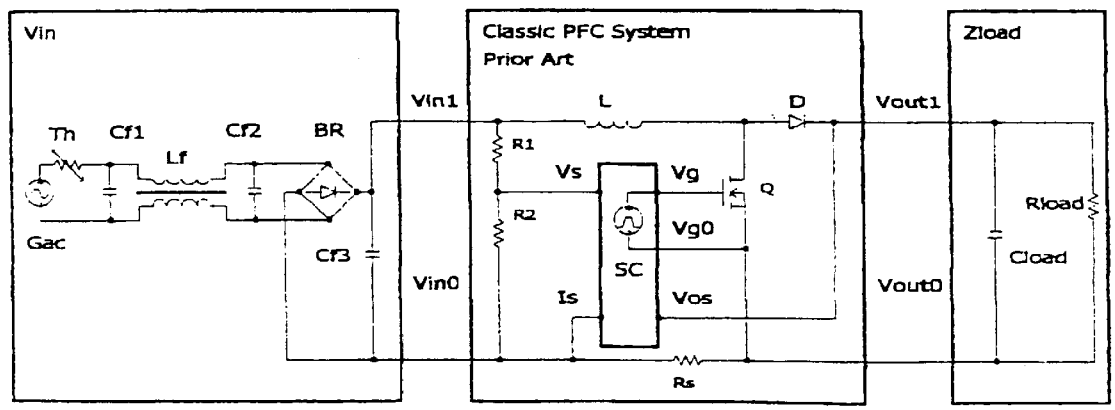
FIG. 1D is a detailed schematic diagram representative of a prior art active PFC.

Reference will now be made in detail to the present drawings which by way of example illustrate various embodiments of the invention. In accordance with the present invention, a PCSD-PFC circuit is provided. For the remainder of this description, the PFC circuit portion of the present invention may be referred to as a "PCSD System." The PCSD System is an electronic architecture able to improve the PF in a circuit by utilizing an internal charge and discharge process, which forces the current waveform shape to follow the voltage waveform shape, in an electrical generator-load circuit. With respect to a standard power supply that incorporates a full-wave rectifier followed by a bulk (storage) capacitor, this invention may improve the PF, from about 0.6 to over 0.99, and may reduce the Total Harmonic Distortion (THD) from over 100% to less than 10%. The output DC voltage may be higher or lower than the input peak voltage. Also, the present invention may be used to improve the efficiency, compared to the standard active PFC circuit, from about 88% to over 97%. Of course, those skilled in the art will recognize that PF, efficiency and THD may be improved to a lesser degree in accordance with the present invention, as desired.

FIG. 2A illustrates the block diagram as a complete generator-load circuit including a PCSD System (10) having five in/out terminals: a first input terminal Vin0 (12), a second input terminal Vin1 (11), a third input terminal Vin2 (15), a first output terminal Vout0 (13), and a second output terminal Vout1 (14). In the diagrams, the PCSD System internal architecture and the positions of the terminals will serve to illustrate the various functions. A first voltage generator VG1 (20), including an AC generator Gac (21), a low pass filter LPF (22), a bridge rectifier BR (23) and a filtering capacitor Cf (24), supplies the PCSD System (10) with a full-wave rectified sine wave voltage between the Vin1 terminal (11) and the Vin0 terminal (12). The Vin2 terminal 15, can be supplied with electrical energy via a three position jumper circuit J1 (26), either from the same source as VG1 (11) (via OA contacts), from a separate voltage generator VG2 (25) (via BO contacts), or even from the load voltage Vout1 (14) (via OC contacts). A Zload block (30), including a bulk capacitor CL (31) and a resistive load RL (32) is connected to the Vout0 (13) and Vout1 (14) output terminals of the PCSD-PFC System block (10). A second simple Jumper J2 (27), is able to connect (or disconnect) Vin0 (12) with Vout0 (13). This jumper is connected only when there is a need for a common connection between the VG1 (20), and/or VG2 (25), and/or the PCSD-PFC System block (10), and/or Zload block (30). Definitely, J2 (27) must be connected when the J1 jumper (26) is in the OC position and the load capacitor CL (31) becomes the voltage generator for Z2 (2).

The PCSD System (10) depicted in FIG. 2A includes: a first two-terminal impedance Z1 (1), a second two-terminal impedance Z2 (2), a first two-position switch SW1 (3), a second two-position switch SW2 (4), and a third two-position switch SW3 (5). Each two-position switch has three terminals: 0, 1 and 2. The two positions are respectively 0–1 or 0–2, and all the three switches are preferably simultaneously in a similar position. In other words, when the first switch (3) is in 0–1 position, the other two switches are preferably also in 0–1 position. Each of the three above switches may be an active or passive device, but at least one switch must be an active device. Physically, the active switch devices may be MOSFETs, IGBTs, Bipolar transistors, SCRs, Triacs, etc, in known fashion. One of ordinary skill in the art will appreciate that the switch elements have the ability to change from the ON to OFF and OFF to ON states quickly and can control the circuit currents and voltages with low self-dissipation. This means, for each switch element, the ON position has a relatively low electrical resistance and the OFF position has a relatively high electrical resistance.

Each of the two above impedances (2) and (3) may include a combination of one or more reactive and resistive elements, such as inductors, capacitors, and resistors. The impedance elements may store and then deliver some (or all) of the stored electrical energy, as dictated by the switching elements ON and OFF times and positions.

As embodied in FIG. 2A, Z1 (1) is connected between terminal 1 of SW1 (3) and the terminal 0 of SW2 (4). Z2 (2) is connected between terminal 1 of SW1 (3) and terminal 0 of SW3 (5). Terminal 0 and terminal 2 of SW1 (3) are coupled together to Vin0 (12). Terminal 1 of SW2 (4) is coupled to Vin1 (11) and terminal 1 of SW3 (5) is coupled to Vin2 terminal (15). Terminal 2 of SW2 (4) is coupled to Vout0 (13) and terminal 2 of SW3 (5) is coupled to Vout1 (14).

FIG. 2A will be presented first by considering the jumper J1 (26) in the OA position, so Vin1 (11) and Vin2 (15) are connected together, and the J2 jumper (27) disconnected.

As further embodied herein, a full-wave rectified voltage is applied to the PCSD System (10) between Vin1 (11) (coupled together to Vin2 (15)) and Vin0 (12).

When all three switches are in 0–1 position, Z1 (1) and Z2 (2) are simultaneously provided (charged) with electrical energy incoming from the Vin block (20) in two parallel circuits:

Vin1 (11), SW2 (4), Z1 (1), SW1 (3) and Vin0 (12);
Vin2 (15), SW3 (5), Z2 (2), SW1 (3) and Vin0 (12).

When all three switches are in 0–2 position, Z1 (1) and Z2 (2) discharge to Zload some (if not all) the stored electrical energy in a series circuit:

Z1 (1), Z2 (2), SW3 (5), Vout1 (14), Zload (30), Vout0 (13), SW2 (4), and through the relatively low high frequency impedance of VG1 (20).

One of ordinary skill in the art will appreciate that the amount of the energy stored in these elements Z1 (1) and Z2 (2) is related to the amount of time the three switches SW1 (3), SW2 (4) and SW3 (5) are in 0–1 position, assuming the time is not too long. The amount of energy delivered to Zload (31) by Z1 (1) and Z2 (2) is related to the amount of time the three switches SW1 (3), SW2 (4) and SW3 (5) are in 0–2 position, again assuming the time is not too long.

Figure 5:
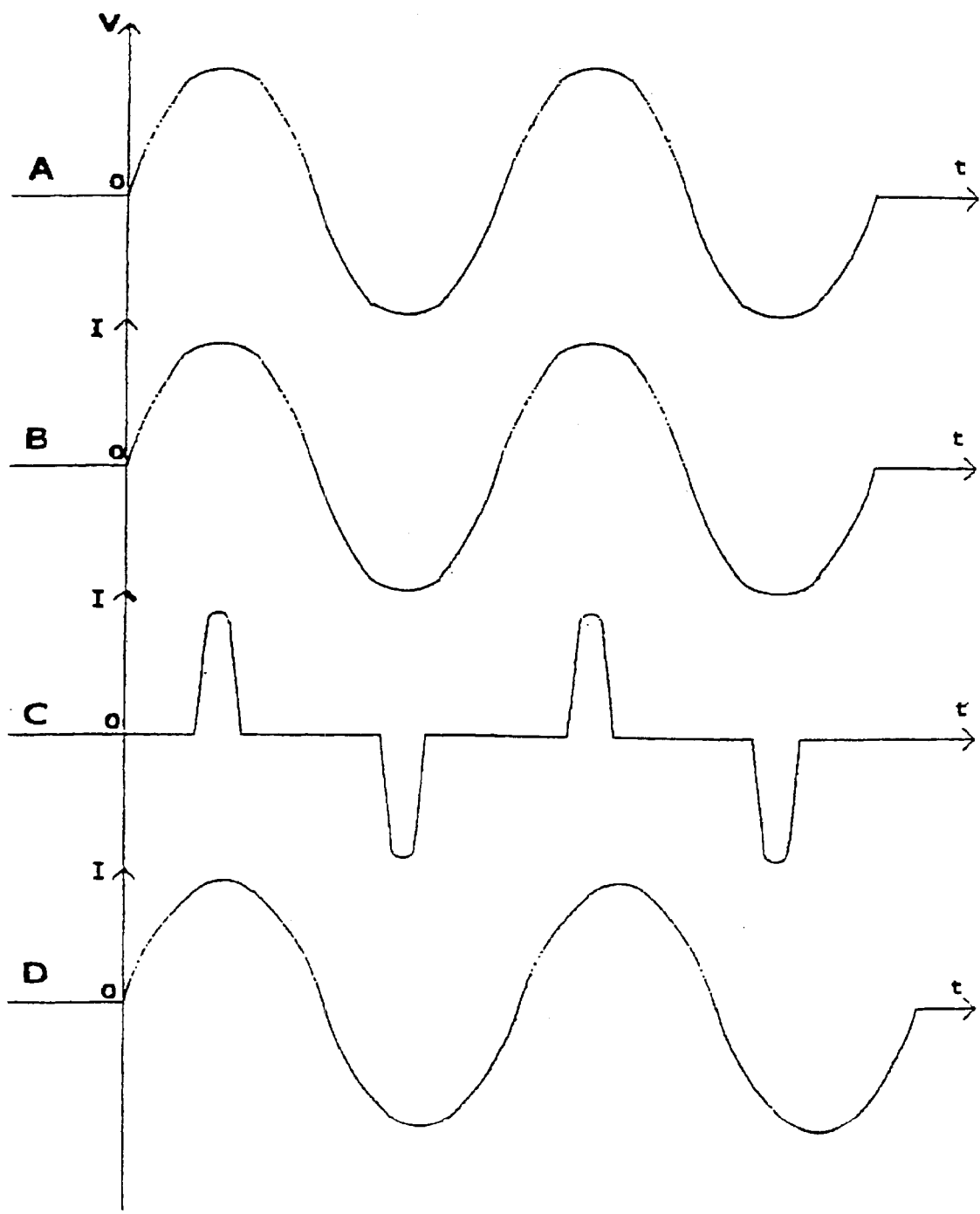
FIG. 5A is the Gac voltage versus time graph.
FIG. 5B is the Gac current versus time graph for a resistive load.
FIG. 5C is the Gac current versus time graph for a capacitive/resistive load and no PFC.
FIG. 5D is the Gac current versus time graph for a capacitive/resistive load and PFC.

It will also be appreciated that, by using an appropriate frequency and duty cycles of the three switches SW1 (3), SW2 (4) and SW3 (5), with respect to the value of Z1 (1) and Z2 (2), the voltage of Gac (21), and Zload (31), the input current waveform from the AC power source will substantially follow the voltage waveform shape at the input (see FIG. 5D). No special voltage sensing or current sensing to allow control of the duty cycle and frequency is required.

By moving the J1 jumper (26) to the OB or OC positions, the PCSD-PFC System of FIG. 2A will exhibit basically the same behavior, but there are some particular situational differences, which will be further presented in this application. For simplifying the explanations of this application, jumpers are depicted and not external switches or fixed connections. Other switches, like dynamic switches, can also be used to provide other advantages.

The advantages of a circuit able to charge two devices, e.g., Z1 (1) and Z2 (2), capable of storing electrical energy in a parallel mode and then to discharge them in a series mode into a reactive load are simplicity of control, more flexibility in optimizing the circuit in/out impedances (versus the load impedance), smaller, less costly circuit elements, and higher efficiency.

FIG. 2B illustrates another embodiment of the present invention, including a complete generator-load circuit VG1 (20) including a PCSD System (10) having four in/out terminals: a first input terminal Vin0 (12), a second input terminal Vin1 (11), a first output terminal Vout0 (13), and a second output terminal Vout1 (14). As depicted in FIG. 2B, the PCSD System internal architecture and the positions of the terminals will illustrate the various functions. A voltage generator VG1 (20), including an AC generator Gac (21), a low pass filter LPF (22), a bridge rectifier BR (23) and a filtering capacitor Cf (24), supplies the PCSD System (10) with a full-wave rectified sine wave voltage between the Vin1 terminal (11) and the Vin0 terminal (12). A Zload block (30), including a bulk capacitor CL (31) and a resistive load RL (32) is connected to the Vout0 (13) and Vout1 (14) output terminals of the PCSD-PFC System block (10). The VG1 (20), PCSD System (10) and Zload (30) are depicted in FIG. 2B to illustrate an embodiment of the invention and can include additional elements within the scope of the invention.

The PCSD System (10) of FIG. 2B includes: a two terminal inductor L1 (41), a capacitor C1 (42), a two terminal electronic switch SW1 (43), a first switching diode D1 (44), and a second switching diode D2 (45). L1 (41) and C1 (42) have one common terminal coupled to Vin0 (12) via SW1 (43). The second terminal of L1 (41) is coupled to Vin (11). The second terminal of C1 (42) is coupled to the cathode of DI (44) and to the anode of D2 (45). The anode of D1 (44) is coupled to Vin1 (11) and also coupled to Vout0 (13). The cathode of D2 (45) is coupled to Vout1 (14).

As further embodied herein, a full-wave rectified voltage is applied to the PCSD System (10) having the positive polarity at Vin1 (11) and the negative polarity at Vin2 (12).

When SW1 (43) is ON, L1 (41) and C1 (42) are simultaneously provided (charged) with electrical energy incoming from the Vin block (20) in two parallel circuits:

Vin1 (11), L1 (41), SW1 (43) and Vin0 (12);
Vin1 (11), D1 (44), C1 (42), SW1 (43) and Vin0 (12).

Alternately, when S1 (43) is OFF, L1 (41) and C1 (42) discharge to Zload (30) some (if not all) the stored electrical energy in a series circuit:

L1 (41), C1 (42), D2 (45), Vout1 (14), ZL (31), Vout0 (13), Vin1 (11) and Vg1 (20).

The discharge circuit polarity is positive at Vout1 (14) with respect to Vout0 (13).

The amount of the energy stored in elements L1 (41) and C1 (42) is related to the amount of time SW1 (43) is ON.

SW1 (43) is preferably not ON long enough for L1 (41) to saturate. The amount of energy delivered to Zload (30) by L1 (41) and C1 (42) is related to the amount of time SW1 (43) is OFF, with the condition VL1+VC1>VLoad. If, during the series discharge process VL1+VC1<Vload, then additional OFF time does not matter, but the OFF time should preferably be at least half of the L1-C1 resonant frequency full period.

Note that as long the Zload (30) voltage is higher than the peak voltage incoming at the Vin1 electrode (11), the Vin (20) circuit includes the PCSD-PFC System (10), but not the Zload (30) circuit, except indirectly by means of the operation of the elements of the PCSD-PFC System (10). By choosing the duty cycle and frequency of switch SW1 (43), based on the values of L1 (41), C1 (42), Gac (21), and Zload (31), (including CL and RL), the input current waveform from the AC power source will substantially follow the voltage waveform shape at the input (see FIG. 5D). It is not necessary to vary the frequency or duty cycle during the individual AC line half-cycles.

Advantages of this circuit can include one or more of the following:

The load voltage can be higher or lower than the input peak voltage.

The load current can be lower or higher than the rms input current.

More circuit degrees of freedom by using two complementary reactive components.

Zero voltage switching (lower dissipation for S1 (43), D1 (44) and D2 (45).

No need for a thermistor or any other "inrush current" protection system.

Smaller inductor, higher efficiency and lower cost.

Less complex (low cost) controller circuit

Figure 3A:
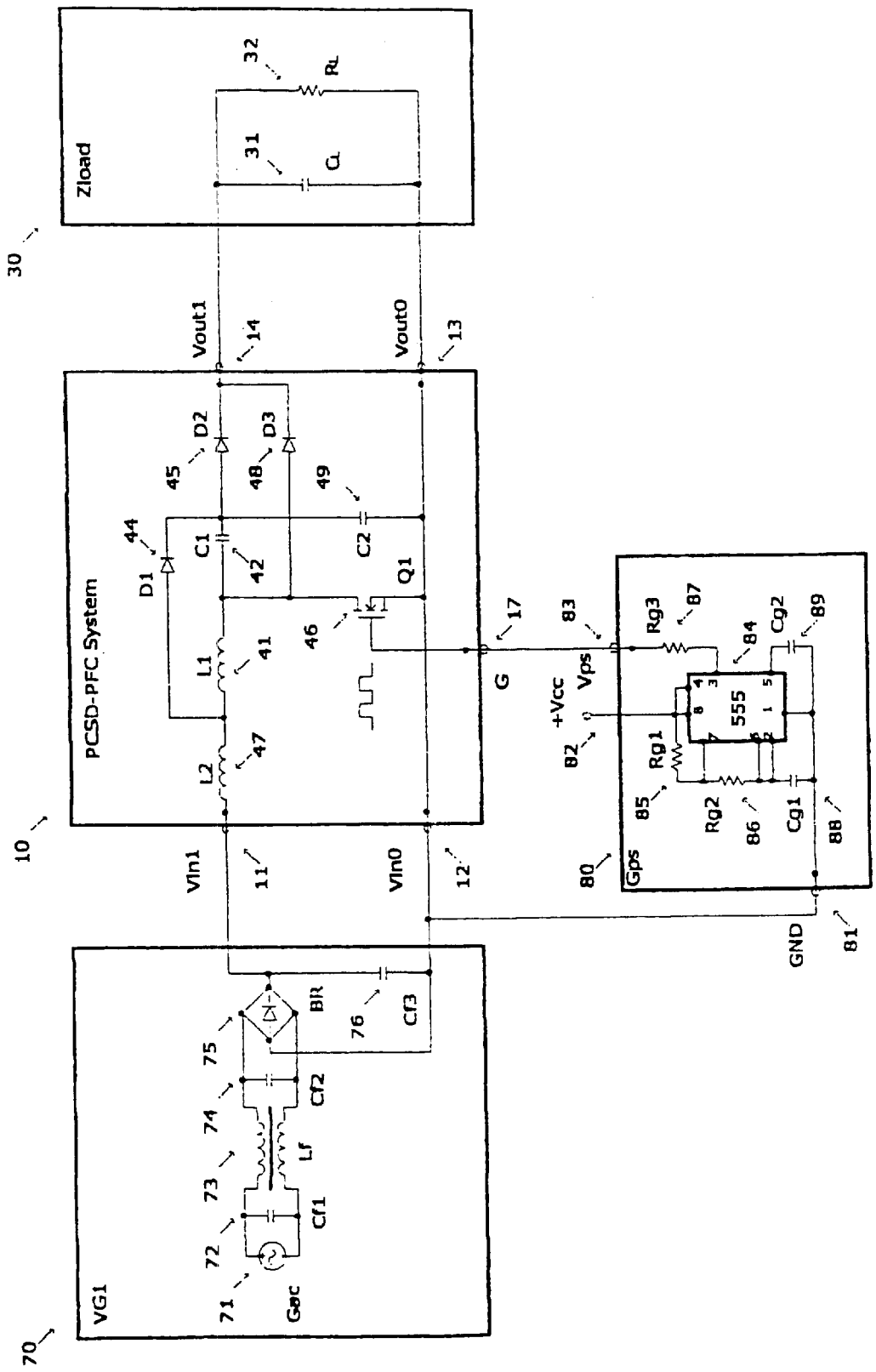
FIG. 3A is a schematic diagram representing an apparatus embodiment of the present invention.

FIG. 3A illustrates another embodiment of the PCSD-PFC Apparatus invention having a complete generator-load circuit including a PCSD System (10) with five in/out terminals—a first input terminal, Vin0 (12), a second input terminal, Vin1 (11), a first output terminal, Vout0 (13), a second output terminal, Vout1 (14) and a control input terminal G (17). In the schematic diagram of FIG. 3A, the architecture and the positions of the terminals serve to illustrate the various functions. By way of example, FIG. 3B presents a parts list of electrical components that may be used to implement the embodiment depicted in FIG. 3A apparatus embodiment. Those of skill in the art will appreciate that many additional and varied components may be utilized within the scope of the invention.

A voltage generator VG (70), including an AC generator Gac (71), a first filtering capacitor Cf1 (72), a four terminal filtering coil Lf (73), a second filtering capacitor Cf2 (74), a bridge rectifier BR (75) and a third filtering capacitor Cf3 (76), supplies the PCSD System (10) with a full-wave rectified sine wave voltage between the Vin1 terminal (11) and the Vin0 terminal (12). A Zload block (30) including a bulk capacitor CL (31) and a resistive load RL (32) is connected to the Vout0 (13) and Vout1 (14) output terminals of the PCSD-PFC System block (10). A pulse generator block Gps (80) having a separate DC supply+Vcc (82) provides, via a Vps output terminal (83), the PCSD-PFC System block (10) with a square voltage pulse signal at the G input (17), with respect to a GND terminal (81) coupled to Vin0 (12). Internally, Gps (80) contains a 555 Timer IC (84), three resistors Rg1 (85), Rg2 (86), Rg3 (87) and two capacitors Cg1 (88), Cg2 (89), coupled in a classic (public domain) astable circuit (multivibrator). Although the components for Gps (80) are listed in FIG. 3B, those of skill in the art will appreciate that a variety of well known pulse generators may be utilized to implement Gps (80).

The PCSD System (10), as illustrated in FIG. 3A includes: a first two-terminal inductor L1 (41), a second two-terminal inductor L2 (47), a first capacitor C1 (42), a second capacitor C2 (49), a first switching diode D1 (44), a second switching diode D2 (45), a third switching diode D3 (48), and a N-channel power MOSFET transistor Q1 (46). L1 (41) and C1 (42) have one common terminal coupled to Vin0 (12) via the drain-source electrode of Q1 (46). The gate of Q1 (46) is coupled to the G control input (17). The second terminal of L1 (41) is coupled to Vin (11) via L2 (47). The second terminal of C1 (42) is coupled to the cathode of D1 (44), to the anode of D2 (45) and via C2 (49) to Vin0 (12). Vin0 (12) is coupled to Q1 (46) source and to Vout0 (13). The anode of D1 (44) is coupled to Vin1 (11) via L2 (47). The cathode of D2 (45) is coupled to Vout1 (14). The D3 diode (48) connects the drain of the Q1 MOSFET (46) to Vout1 (14).

As further embodied herein, a full-wave rectified voltage is applied to the PCSD System (10) having the positive polarity at Vin1 (11) with respect to Vin0 (12). During the time Q1 (46) is ON, L1 (41) and C1 (42) are simultaneously provided (charged) with electrical energy incoming from the VG1 (70) in two parallel circuits:

Vin (11), L2 (47), L1 (41), Q1 (54) and Vin0 (12);

Vin (11), L2 (47), D1 (44), C1 (42), Q1 (46) and Vin0 (12).

When Q1 (46) is OFF, L1 (41) and C1 (42) discharge to Zload (30) some (if not all) of their stored electrical energy in a series circuit:

L2 (47), L1 (41), C1 (42), D2 (45), Vout1 (14), Zload (30), Vout0 (13), Vin1 (11), and again through VG1.

The discharge circuit polarity is positive at Vout1 (14) with respect to Vout0 (13).

To illustrate the apparatus and method of the invention depicted in FIG. 3A, for a Gac (71) rms voltage of 120V (US standard) and using a relatively low cost MOSFET transistor (IRF740), and with IC controller (555 Timer) providing at G (17) input a 15V peak pulse having a period T=14.2 uS with the ON time Ton=7.4 uS, the system provides 380V DC to a 570 ohm load (250 w). The PF is 0.996 (despite a 100 uF bulk capacitor), THD=8.5%, and the efficiency of the PCSD System block (10) is over 95%. The parts used to implement this example embodiment are further described in FIG. 3B.

FIG. 3A can be described as a "boost, non-resonant, passive" PCSD-PFC System. The criteria for this description and also the importance of L2 (47), C2 (49) and D3 (48) in the circuit shall be further explained during the presentation of the next embodiment. This particular embodiment for the apparatus proves that even in non-resonant operation and at relatively high power, the PCSD system is cost effective and very efficient.

It will be apparent to those skilled in the art that various modifications and variations can be made in the apparatus and method of the present invention without departing from the spirit or scope of the invention. Thus, it is intended that the present invention cover the modifications and variations of the embodiments depicted and examples described, provided they come within the scope of the appended claims and their equivalents.

For FIGS. 4A–4D, in order to simplify the presentation of these four alternative embodiments, the external blocks are not shown in each drawing. Based on identical reference numbers for the in/out terminals (11), (12), (13), (14) of the PCSD-PFC System (10), it is to be considered that the next three embodiments can be connected in similar fashion to the embodiment in FIG. 2B, to the Vin block (20) and to the Zload block (30).

Figure 4:
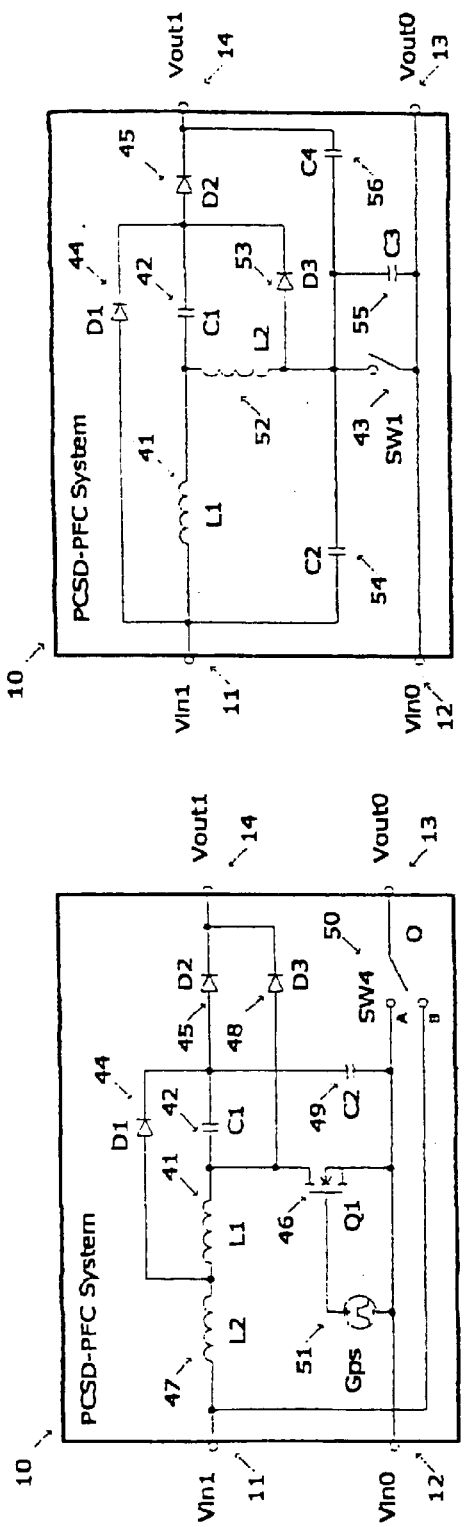
FIG. 4A is a schematic diagram representing another embodiment of the present invention.
FIG. 4B is a schematic diagram representing still another embodiment of the present invention.
FIG. 4C is a schematic diagram representing yet another embodiment of the present invention.
FIG. 4D is a schematic diagram representing also another embodiment of the present invention.
Figure 4:
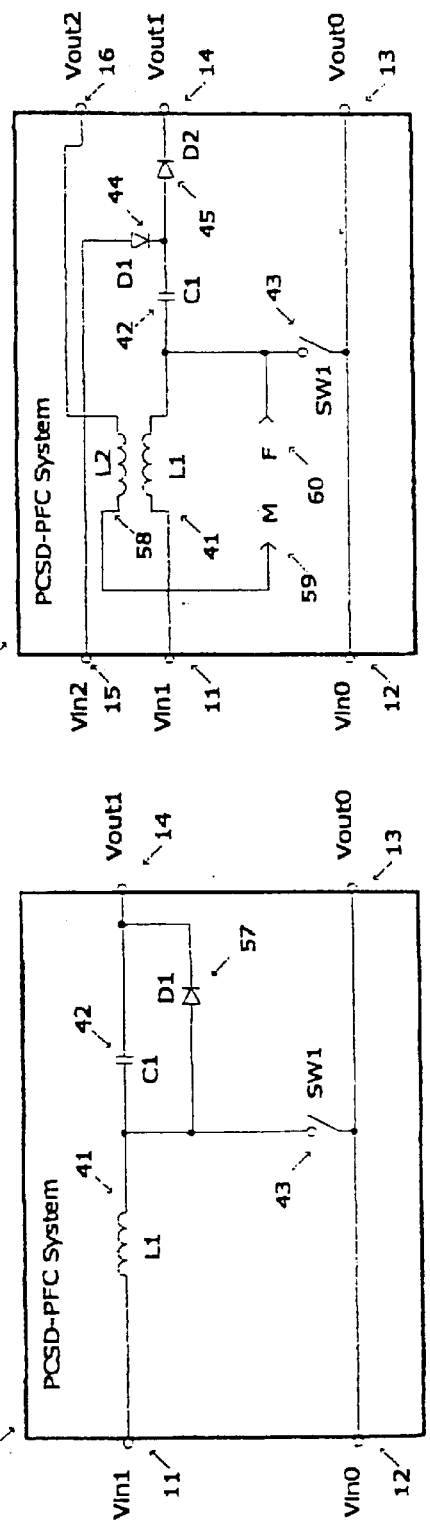

FIG. 4A illustrates another PCSD-PFC embodiment including a PCSD System (10), having four in/out terminals: a first input terminal Vin0 (12), a second input terminal Vin1 (11), a first output terminal Vout0 (13) and a second output terminal Vout1 (14). Similar to the embodiment depicted in FIG. 2B, there is a Vin block (20) as a supplier of electrical power, and a Zload block (30) as an receptor of electrical power, which are connected to the embodiment in accordance to the same reference numbers.

The PCSD System (10) includes: a first two-terminal inductor L1 (41), a second two-terminal inductor L2 (47), a first capacitor C1 (42), a second capacitor C2 (49), a first switching diode D1 (44), a second switching diode D2 (45), a third switching diode D3 (48), a N-channel power MOSFET transistor Q1 (46) and a pulse generator Gps (51). L1 (41) and C1 (42) have one common terminal coupled to Vin0 (12) via the drain-source electrodes of Q1 (46). The gate-source input of Q1 (46) is coupled to Gps (51). The second terminal of L1 (41) is coupled to Vin (11) via L2 (47). The second terminal of C1 (42) is coupled to the cathode of D1 (44), to the anode of D2 (45) and, via C2 (49), to Vin0 (12). Vin0 (12) is coupled to Q1 (46) source and to Vout0 (13). The anode of D1 (44) is coupled to Vin1 (11) via L2 (47). The cathode of D2 (45) is coupled to Vout1 (14) The D3 diode (48) connects the drain of the Q1 MOSFET (46) to Vout1 (14). A two-position switch SW4 (50) couples the Vout0 electrode (13) to Vin0 (12) in the OA position and to Vin1 (11) in the OB position.

This embodiment architecture is similar to the apparatus embodiment presented in FIG. 3A, with the exception of Gps (51) and SW4 (50). This specific circuit topology was chosen to facilitate description of the PCSD System (10). However, various topologies, methods and/or criteria for high performance (regarding PF and efficiency), by optimizing the cost/performances issue in each particular application will be understood by those of skill in the art.

As further embodied in FIG. 4A, a full-wave rectified voltage is applied to the PCSD System (10) having the positive polarity at Vin1 (11) with respect to Vin0 (12). No matter the SW4 (50) position, when Q1 (46) is ON, L1 (41), L2 (46) and C1 (42) are. simultaneously provided (charged) with electrical energy incoming from the VG1 block (20) in two parallel circuits:

Vin (11), L2 (47), L1 (41), Q1 (46) and Vin0 (12);
Vin (11), L2 (46), D1 (44), C1 (42), Q1 (46) and Vin0 (12).

When Q1 (46) is OFF, L1 (41), L2 (46) and C1 (42) discharge to Zload (30) some (if not all) of the stored electrical energy in a series circuit:

L1 (41), L2 (46), C1 (42), D2 (45), Vout1 (14), ZL (31), Vout0 (13), Vin0 (12), Vin1 (11), and including again the VG1 block (not shown).

The importance of SW4 (50) appears in the situation when an output DC voltage lower in amount than the input peak voltage is desired. Similar to the classic converter behavior, when SW4 (50) is in the OA position, the PCSD PCF System (10) acts as a "boost" converter, so the minimum output voltage is preferably higher than the maximum input voltage. However, similar to a classic "buck-boost" converter, when SW4 (50) is in the OB position, even when the output voltage level is lower then the input voltage, no current incoming from Gac (21) will directly include Zload (30). The discharge circuit polarity is positive at Vout1 (14) with respect to Vout0 (13).

In the PCSD-PFC System, the configuration of the circuit architecture and the devices main parameters are decided after are choosing the three main working criteria:

1. Basic topology: Boost, Buck-Boost, Dynamic Buck-Boost;
2. Circuit Operation: resonant, non-resonant;
3. Charge-Discharge method: active, passive.

The schematic presented at FIG. 4A is an example of a PCSD-PFC System able to achieve any combination of the above working criteria, based only on the selection and parameters of the components. As soon the optimum combination of the three main criteria is selected based on desired function and performance, those of skill in the art can select the parameters of each component for the preferred cost/performance choice. In the following paragraphs details will be provided to explain the circuit operation and the charge-discharge methods.

With respect to the resonant frequency of the two main impedances L1 (41), C1 (42) mentioned above, basically there are two preferred ways of operating a PCSD system: the resonant, and the non-resonant method.

The resonant, variable frequency method, is the most efficient (low dissipation in the MOSFET switch) and does not require a sophisticated (and expensive) controller, as long the system is supplying a constant load from a constant rms input voltage. However, when a PCSD system is supplying a variable load from a variable input voltage, the system preferably includes a controller able to adjust the frequency, keeping a constant OFF time, in order to maintain the level of the output voltage. (It should be noted that this method still does not require the complexity of existing PFC controller ICs as previously discussed.) The preferred OFF time (for high efficiency reasons) is slightly more than half of the L1 (41)-C1 (42) complete cycle (in order to have zero voltage on the MOSFET power switch at the time of turn-on). Of course, if there are other impedances (such as L2, C2, etc) involved in the charge/discharge circuit, the minimum OFF time can be adjusted accordingly.

The non-resonant, or the constant frequency method, is the most simple and cost effective way of operating a PCSD system. The controller frequency is typically somewhat lower than the L1 (41)-C1 (42) resonant frequency and the duty cycle can be selected based on input voltage, output voltage, and power, and in extreme cases may range from as low as 1% and perhaps as high as 95%, where the OFF time is preferably larger than half of the L1 (41)-C1 (42) full cycle (if there are no other impedances to be considered). More typical duty cycles range from 5% to 65%.

For performance and cost considerations a semi-resonant method is sometimes useful. Similar to the non-resonant method, the controller preferably provides constant frequency and variable duty-cycle, but L1 (41)-C1 (42) are calculated to be close to resonance when the system is delivering the maximum power to the load (maximum duty cycle).

In all of the above PCSD-PFC cases, the duty cycle of the switch is preferably held constant during any given half AC line cycle and will approximately vary in response to input line voltage or load changes for best performance.

In an ideal PCSD system, the efficiency is 100%, because, theoretically, there is no loss of energy in the reactive components or switches. In a real PCSD system, each of the components, potentially including real inductors, real capacitors and real switches, such as diodes and MOSFET transistors, dissipate in heat some small amount of the incoming electrical energy. The total losses, especially the loss in the MOSFET switch, decrease the efficiency from the ideal 100%. For optimal performance one of skill in the art should consider the operations and desired criteria for the real-world implementation of a PCSD-PFC system:

1. Charge an L and a C, in a parallel circuit, from the same or different voltage source;
2. Discharge an L and a C in a series circuit, into the load circuit;
3. Decrease (to minimum for a given power) the MOSFET switch peak current; and
4. Decrease (ideally to zero) the voltage across the MOSFET switch before starting the next charging cycle.

Similar to the ideal situation, the first two operations (charge and discharge) resolve the PF issue in the generator-load circuit, provided there is approximately a constant switch duty cycle. The third and the fourth items are criteria that relate to the efficiency of a real PCSD system. The lower the MOSFET peak current during the ON time and the lower the MOSFET voltage before next charging cycle starts, the higher the efficiency of the system.

There are a number of ways to minimize the dissipation inside the system, starting with the resonant method, described above, and finishing with a proper selection of electrical parts. The extra parts included in the schematic diagram illustrated at FIG. 4A, in comparison to FIG. 2B (L2 (47), C2 (49) and D3 (48)), represent some of the ways of improving the system efficiency. For example, L2 (47) can help to limit the peak charging current of C1 (42), and therefore can affect the MOSFET drain peak current at turn-on for some modes of operation. C2 (49), via C1 (42), can create a short delay for the rapid increasing voltage of the drain on Q1 (46), immediately after the transistor is shut OFF, and can reduce switching losses in Q1. D3 (48) can limit (up to the load voltage) drain voltage on Q1 (46). Finally, C1 (42), besides supplying energy to the load, plays a role in decreasing the voltage across the MOSFET switch.

By helping to limit the peak current of Q1 (46) and helping to keep its switching losses low, the dissipation of Q1 (46) is considerably reduced and the efficiency of the entire system can be substantially improved.

The PCSD System (10) illustrated in FIG. 4A is working "active" when the average discharging current to the load is greater via D2 (45) than via D3 (48), and is working "passive" when the average discharging current to the load is greater via D3 (48) than via D2 (45). As an example, for a constant switching frequency, by increasing the C1 (42) value, the system becomes more "active" and by increasing L1 value, the system becomes more "passive". In the extreme, the system becomes completely active, if D3 (48) is disconnected or completely passive if the voltage generator for C1 (42) is the load capacitor CL (31) (see FIG. 4C and descriptions).

Based on the variables described herein, one of skill in the art will appreciate that the PCSD System (10), e.g. in FIG. 4A, can be boost and/or buck-boost, and/or resonant, and/or non resonant, and/or active, and/or passive, or any combination between the above configurations, depending on the number and characteristics of the parts selected and the selected switching frequency and ON and OFF times.

The advantages of this circuit were already described above, including the importance of L2 (47), C2 (49) and D3 (48) into the circuit. Additionally, there is the option of working in boost and/or buck-boost mode, by activating, statically or dynamically, SW4 (50).

FIG. 4B illustrates another PCSD-PFC embodiment including a PCSD System (10), having four in/out terminals: a first input terminal Vin0 (12), a second input terminal Vin1 (11), a first output terminal Vout0 (13) and a second output terminal Vout1 (14). Similar to the embodiment depicted in FIG. 2B, there is a Vin block (20) as a supplier of electrical energy, and a Zload block (30) as an receptor of electrical energy, which can be connected to the embodiment in accordance to the same reference numbers.

The PCSD System (10) depicted in FIG. 4B includes a first two-terminal inductor L1 (41), a second two-terminal inductor L2 (52), a first capacitor C1 (42), a second capacitor C2 (54), a third capacitor C3 (55), and a fourth capacitor C4 (56), an electronic switch SW1 (43), a first switching diode D1 (44), a second switching diode D2 (45), and a third switching diode D3 (53). L1 (41) and C1 (42) have one common terminal coupled to the first terminal of L2 (52). The second terminal of L2 (52) is coupled directly to the anode of D3 (53), and, via SW1 (43), is coupled to Vin0 (12). The cathode of D3 (53) is coupled to the anode of D2 (45), the cathode of D1 (44) and the second terminal of C2 (42). The other terminal of L1 (41) and the anode of D1 are coupled together to Vin (11). Vin0 (12) is also coupled to Vout0 (13). C2 (54) is coupled between Vin1 (11) and the anode of D3 (53). The anode of D3 (53) is also coupled via C3 (55) to Vin0 (12) and via C4 (56) to Vout1 (14). The cathode of D2 (45) is also coupled to Vout1 (14).

As further embodied herein, a full-wave rectified voltage is applied to the PCSD System (10) having the positive polarity at Vin1 (11) with respect to Vin 0 (12). When S1 (43) is ON, L1 (41) and C1 (42) are simultaneously provided (charged) with electrical energy incoming from the Vin block (20) in two parallel circuits:

Vin1 (11), L1 (41), L2 (52), SW1 (43) and Vin0 (12);
Vin1 (11), D1 (44), C1 (42), L2 (52), S1 (43) and Vin0 (12).

When S1 (43) is OFF, L1 (41) and C1 (42) discharge to Zload (30) some (if not all) the stored electrical energy in a series circuit:

L1 (41), C1 (42), D2 (45), Vout1 (14), ZL (31), Vout0 (13), Vin1 (11).

As similarly suggested before, from a high frequency point of view Vin0 (12) and Vin1 (11) are coupled together via the components in the VG1 block.

Those of skill in the art will appreciate that by introducing L2 (52), the peak charging current of C1 (42) decreases, thereby allowing lower dissipation for SW1 (43). Also, L2 (52) modifies the resonance curve of the L1/C1 circuit, again offering more degrees of freedom and can add stability to the system. Moreover, by introducing D3 (53), an extra discharge current due to energy stored by L2 (52) can be recovered and delivered to Zload (30) (not shown). Also L2 (52) and D3 (53) can help to reduce the differential voltage on SW1 (43).

The discharge circuit polarity is positive at Vout1 (14) with respect to Vout0 (13). The circuit functionality and advantages of the embodiment of FIG. 4B are similar to the embodiment depicted in FIG. 2B above.

FIG. 4C illustrates another PCSD-PFC embodiment, including a PCSD System (10) having four in/out terminals, a first input terminal Vin0 (12), a second input terminal Vin1 (11), a first output terminal Vout0 (13) and a second output terminal Vout1 (14).

Similar to the embodiment in FIG. 2B, there is a Vin block (20) as a supplier of electrical energy, and a Zload block (30) as an receptor of electrical energy, which can be connected to the present embodiment in accordance to the input and output terminals.

Those of skill in the art may consider the embodiment of FIG. 4C as the simplest and the most "resonant-passive" PCSD-PFC embodiment. The PCSD System (10) includes a first two-terminal inductor L1 (41), a capacitor C1 (42), a two-terminal electronic switch SW1 (43), and a switching diode D1 (52). L1 (41) and C1 (42) have one common terminal coupled directly to the anode of the D1 switching diode (57) and via SW1 switch (43) to Vin0 (12) and Vout0 13. The other terminal of L1 (41) is coupled to Vin1 (11). The other terminal of C1 is coupled to the cathode of D1 (57) and to Vout1 (14).

As further embodied herein, a full-wave rectified voltage is applied to the PCSD System (10) having the positive polarity at Vin1 (11) with respect to Vin 0 (12).

When S1 (43) is ON, L1 (41) and C1 (42) are simultaneously provided (charged) with electrical energy incoming from, the Vin block (20) for L1 coil (41), and from Vout1 (14) for the C1 capacitor (42), in two parallel circuits through SW1 (43):

Vin1 (11), L1 (41), SW1 (43) and Vin0 (12);
Vout1 (14), SW1 (43), Vout0 (13) and CL (31).

When SW1 (43) is OFF, L1 (41) and C1 (42) discharge to Zload (30) some (if not all) the stored electrical energy in a series circuit:

L1 (41), C1 (42), Vout1 (14), ZL (30), Vout0 (13), and again through the low impedance at the input due to the VG1 components.

Should C1 (42) be completely discharged, an extra discharge current incoming from the L1 coil (41) only will be delivered to the load via:

L1 (41), D1 (57), Vout1 (14), ZL (30), Vout0 (13), Vin0 (12), Vin1 (11).

In this particular embodiment of the PCSD system, a difference is that CL (30) (not shown) becomes the source of electrical energy for C1 (42). In the block diagram illustrated in FIG. 2A, by connecting the J1 jumper (26) in the CO position, we have the essential circuit of FIG. 4C. Obviously, by charging and discharging a capacitor from and to the same source, there is no transfer of energy. But if the value of the C1 capacitor (42) value is very small with respect to the load capacitor, and the L1 (41) discharge current is considerably higher than the C1 (42) charging current, then the CL (31) capacitor can be charged to any voltage amount. In this situation, the C1 capacitor (42) acts "passive" with respect to the output voltage level, and provides a valuable function by reducing the voltage across SW1 (43) (e.g., MOSFET transistor) and allowing for approximately zero voltage at the point of turn-on. Near the resonant frequency, the efficiency of this particular "passive-resonant" PCSD System can be, for example, around 98%.

FIG. 4D illustrates another PCSD-PFC embodiment, as a PCSD System (10) having six in/out terminals—a first input terminal Vin0 (12), a second input terminal Vin1 (11), a third input terminal Vin2 (15), a first output terminal Vout0 (13), a second output terminal Vout1 (14) and a third output terminal Vout 2 (16). It should be understood by this example, that the invention is not limited to a particular number of inputs or outputs, power sources or loads.

Similar to the embodiment depicted in FIG. 2A, the PCSD System (10) in FIG. 4D can include external elements (not shown). External to the elements shown in FIG. 4D, a first voltage generator VG1 (20), including an AC generator Gac (21), a low pass filter LPF (22), a bridge rectifier BR (23) and a filtering capacitor Cf (24), can be used to supply the PCSD System (10) of FIG. 4D with a full-wave rectified sine wave voltage between the Vin1 terminal (11) and the Vin0 terminal (12). The Vin2 terminal (15) can be supplied with electrical energy via a three position jumper circuit J1 (26), either from the same source as VG1 (11) (via OA contacts), from a separate voltage generator VG2 (25) (via OB contacts), or even from the load voltage Vout1 (14), (via OC contacts) as depicted in FIG. 2A. A Zload block (30), including a bulk capacitor CL (31) and a resistive load RL (32) like that shown in FIG. 2A, can be connected to the Vout0 (13) and Vout1 (14) output terminals of the PCSD-PFC System block (10) of FIG. 4D. A second simple Jumper J2 (27), like that shown in FIG. 2A, can be used to connect (or disconnect) Vin0 (12) with Vout0 (13) of FIG. 4D. This jumper (not shown in FIG. 4D) is connected only when there is a need for a common connection between the Vin1 (11), and/or Vin2 (15), and/or the PCSD-PFC System block (10) in FIG. 4D, and/or Zload block (30) (not shown in FIG. 4D). Referring again to FIG. 2A, J2 (27) must be connected when the J1 jumper (26) is in the OC position and the load capacitor CL (31) becomes the voltage generator for C1 (42) depicted in FIG. 4D.

The importance of the PCSD-PCF System (10) output Vout2 (16) in FIG. 4D will be explained.

The PCSD System (10) in the embodiment of FIG. 4C includes a first two-terminal inductor L1 (41), a second two-terminal inductor L2 (58), a capacitor C1 (42), an electronic switch SW1 (43), a first switching diode D1 (44), and a second switching diode D2 (45). L1 (41) and C1 (42) have one common terminal coupled to Vin0 (12) via SW1 (43). Vin0 (12) is also coupled to Vout0 (13). The second terminal of L1 (41) is coupled to Vin1 (11). The second terminal of C1 (42) is coupled to the cathode of D1 (44) and to the anode of D2 (45). The anode of D1 (44) is coupled to Vin1 (11) via L2 (58). The cathode of D2 (45) is coupled to Vout1 (14). The second two terminal inductor L2 (58) has one terminal coupled to Vout2 (16) and to "floating" terminal M (59) which can be connected to different points inside of the PCSD System (10), including terminal F (60) which is connected to the common connection between L1 (41), C1 (42) and SW1 (43). Vout2 (16) is floating also, ready to be connected externally. With respect to L1 (41), L2 (58) may have mutual field-coupling factors between −1 and 1 (including zero). As described further below, the coupling options are designed to give more flexibility to the PCSD System (10) and can be hard wired, actively or passively switched, or otherwise arranged depending on the desired kind of improved performance and the power factor characteristics.

The embodiment of FIG. 4D includes similar component functionality of the embodiment depicted in FIG. 2B, except for the second inductor L2 (58). In this case, Vout0 (13) can be coupled to Vin0 (12), similar to FIGS. 4B and 4C. Therefore, until CL (31) (not shown) is fully charged, a direct current will exist between VG1 (20) and Zload (30) (not shown). When the voltage on Zload becomes higher than the peak input voltage, there is no more generator-load direct current. Additionally, without connecting L2 (58), the present embodiment operates similarly to the embodiment depicted in FIG. 2B above.

The floating inductor L2 (58) in FIG. 4D provides more flexibility to the PCSD System (10) and may have (at least) the following circuit options:

a. Coupled series into the Vin1 (11) circuit, similar to L2 (47) in FIG. 3A;
b. Coupled series into any in/out terminal circuit of the PCSD System (10) in FIG. 4D;
C. Absorbing a part of the L1 (41) flux field, and becoming an independent voltage generator for supplying C1 (42), an IC controller, or even a complete separate system, external to the PCSD System (10).

Although the written description above contains many specificities and examples, these should not be construed as limiting the scope of the invention, but as merely providing illustrations of some of the presently preferred embodiments of this invention. For example, more than one power supply can be connected to the input of the PCSD system, additional elements including inductors, resistors, capacitors, diodes, electronic devices, additional switches, etc., well known by those skilled in the art, can be added. It will be apparent to one of ordinary skill in the art that many changes and modifications can be made to the written description without departing from the spirit and scope of the appended claims.

What is claimed is:

1. A power factor correction system for improving the power factor during transfer of power from an AC power source to a reactive time-varying or non-linear load comprising:

a full-wave rectifier circuit operatively connected to said AC power source for transforming an AC power signal to a DC power signal;

a reactive load;

a first impedance capable of storing energy, said first impedance coupled to said rectifier circuit so as to receive energy;

a second impedance capable of storing energy, said second impedance coupled to said first impedance and coupled to said load;

a switch coupled at one end to said first impedance and said second impedance, said switch having an open and closed state, said closed state causing said first impedance and said second impedance to store energy, said open state causing said first impedance and said second impedance to discharge energy; and a control circuit for controlling said switch so that the input current waveform into said full-wave rectifier will approximate the voltage waveform into said full-wave rectifier input.

2. The system of claim 1 wherein said first impedance includes an inductor and said second impedance includes a capacitor.

3. A parallel charge, series discharge system for power factor correction during transfer of power from an AC power source comprising:

a full-wave rectifier circuit coupled to said AC power source;

a reactive load;

at least two impedances capable of storing electrical energy and coupled to said full-wave rectifier circuit and also coupled to said reactive load; and a switching circuit having at least a first and second position, said first position resulting in at least two of said impedances connected in parallel for storing energy received by said full-wave rectifier, and said second position resulting in at least two of said impedances being coupled in series for discharging energy into at least one load.

4. The system of claim 3, wherein one of said impedances is an inductor and another of said impedances is a capacitor.

5. The system of claim 3 wherein said switching circuit comprises a transistor coupled to a control circuit for providing ON and OFF signals to the input terminal of said transistor, said signals corresponding to said first and second position of said switch.

6. An electronic system for improving the power factor in a circuit by means of an internal energy charge and energy discharge process comprising:

inductance means for storing and discharging electrical energy;

capacitance means for storing energy and discharging electrical energy, said capacitance means coupled to said inductance means; and a switch connected at one end to said inductance means and said capacitance means, said switch having at least a first and second position, said first position resulting in said inductance means and said capacitance means storing electrical energy, said second position resulting in said inductance means and said capacitance means discharging electrical energy, and the frequency of said switch timing of the first and second positions such that the current waveform shape into said electronic system is approximately the same as the voltage waveform shape into said electronic system.

7. The system of claim 6 wherein said switch comprises at least one transistor and a control circuit for providing ON and OFF signals to the input terminal of said transistor, said signals corresponding to said first and second position of said switch.

8. The system of claim 7 wherein said control circuit includes a pulse generator.

9. A power factor correction system for improving the power factor and efficiency during transfer of power from an AC power source to a reactive, time-varying or non-linear load comprising:

a full-wave rectifier circuit for transforming an AC signal from said AC power source to a DC signal;

a load;

an inductive circuit capable of storing energy, said inductive circuit coupled to said full-wave rectifier;

a diode coupled at the anode to said full-wave rectifier and said inductive circuit;

a capacitive circuit capable of storing energy, said capacitive circuit coupled to the cathode of said diode, said capacitive circuit coupled to said inductive circuit and to said load;

a switch circuit coupled to said capacitive circuit and said inductive circuit at one end and coupled to circuit common at said other end, said switch having at least a first and second state, said first state causing said capacitive circuit and said inductive circuit to be in parallel with said load and said full-wave rectifier thereby allowing said capacitive circuit and said inductive circuit to store energy, said second state causing said capacitive circuit and said inductive circuit be in series with said load and said full-wave rectifier thereby causing said capacitive and said inductive circuit to discharge energy into said load; and a control circuit comprising a pulse generator and a transistor for controlling the frequency and duty cycle of said switch states so that the input current waveform into said full-wave rectifier will approximate the voltage waveform into said rectifier input whereby the power factor is greater than 0.97 and the efficiency of the system is over 95%.

10. The system of claim 9 wherein said pulse generator is a timer 555 circuit.

11. The system of claim 9 wherein said pulse generator is a comparator oscillator circuit.

12. The system of claim 9 wherein said pulse generator is a square wave generator.

13. The system of claim 9 wherein said pulse generator is a rectangular wave generator.

14. A power factor correction system for improving the power factor during transfer of power from an AC power source to a reactive, time-varying or non-linear load comprising:

a full-wave rectifier circuit for transforming an AC signal from said AC power source to a DC signal;

a load;

an inductive circuit capable of storing energy, said inductive circuit receiving energy from said full-wave rectifier;

a capacitive circuit having a first and second terminal and capable of storing energy, said capacitive circuit coupled at said first terminal to said full-wave rectifier and said inductive circuit, said second terminal coupled and to said load;

a diode coupled at the anode to said full-wave rectifier and said inductive circuit, said diode coupled at the cathode to said load and said capacitive circuit second terminal;

a switch circuit coupled to said first terminal of said capacitive circuit and said inductive circuit, said switch having a first and second state, said first state causing said capacitive circuit and said inductive circuit to store energy and to be in parallel with said load and said full-wave rectifier, said second state causing said capacitive circuit and said inductive circuit to discharge energy and to be in series with said load and said full-wave rectifier; and a control circuit for controlling the frequency and duty cycle of said switch states, so that the input current waveform into said full-wave rectifier will approximate the voltage waveform into said rectifier input.

15. A power factor correction system for improving the power factor and efficiency during transfer of power from an AC power source to a reactive, time-varying or non-linear load comprising:

a full-wave rectifier circuit for transforming an AC signal from said AC power source to a DC signal;

a load;

a first inductive circuit having a first and second terminal, said inductive circuit coupled at said first terminal to said full-wave rectifier and the return of said load;

a second inductive circuit having a first and second terminal, said first terminal coupled to said first inductive circuit;

a first diode coupled at the anode to said first and second said inductive circuits;

a capacitive circuit capable of storing energy and having a first and second terminal, said capacitive circuit coupled said first terminal to said first diode cathode, said capacitive circuit coupled at said second terminal to said second terminal of said second inductive circuit;

a second diode coupled at the anode to said first terminal of said capacitive circuit, said diode coupled at the cathode to said load;

a switch circuit having at least two terminals, said switch circuit coupled at said first terminal to said second terminal of said capacitive circuit and said second inductive circuit at said second terminal and coupled to circuit common at said other terminal, said switch having at least two states, said first state causing said capacitive circuit and said first and second inductive circuits to be in parallel with said load and said full-wave rectifier thereby allowing said capacitive circuit and said first and second inductive circuits to store energy, said second state causing said capacitive circuit and said inductive circuit be in series with said load and said full-wave rectifier thereby causing said capacitive and said first and second inductive circuits to discharge energy into said load; and a control circuit comprising a pulse generator and a transistor for controlling the frequency and duty cycle of said switch states so that the input current waveform into said full-wave rectifier will approximate the voltage waveform into said rectifier input.

16. A power factor correction system for improving the power factor and efficiency during transfer of power from an AC power source to a reactive, time-varying or non-linear load comprising:

a full-wave rectifier circuit for transforming an AC signal from said AC power source to a DC signal;

a load;

a first inductive circuit having a first and second terminal, said inductive circuit coupled at said first terminal to said full-wave rectifier;

a second inductive circuit having a first and second terminal, said first terminal coupled to said second terminal of said first inductive circuit;

a capacitive circuit capable of storing energy and having a first and second terminal, said first terminal coupled to said second terminal of said first inductive circuit;

a first diode coupled having an anode and cathode, said anode coupled to said second terminal of said capacitive circuit, said cathode coupled to said load;

a second diode coupled having an anode and cathode, said anode coupled to said first terminal of said first inductive circuit, said cathode coupled to said second terminal of said capacitive circuit;

a third diode having an anode and cathode, said anode coupled to said second end of said second inductive circuit, said cathode coupled to said anode of said first diode;

a switch circuit having at least two terminals, said switch coupled to said second inductive circuit at said second terminal and coupled to circuit common at said second terminal, said switch having at least two states, said first state causing said capacitive circuit and said first and second inductive circuits to store energy, said second state causing said capacitive circuit and said first and second inductive circuits to discharge energy into said load; and a control circuit comprising a pulse generator and a transistor for controlling said switch states so that the input current waveform into said full-wave rectifier will approximate the voltage waveform into said rectifier input.

17. A method of parallel charge, series discharging for power factor correction in a circuit having two or more impedances and comprising:

rectifying an AC voltage wave form using a rectifier circuit coupled to an external AC power source so that a load receives a DC voltage waveform;

activating a switching circuit having at least a first and second position, said activation of switch resulting in a first position, resulting in at least two of said impedances to store energy from said full-wave rectifier circuit and said load;

storing electrical energy in at least two said impedances;

activating said switching circuit to a second position resulting in at least two of said impedances discharging energy into said load;

discharging energy stored in at least two of said impedances from said DC waveform and said load into said load; and repeating the above steps by controlling the activation of said switch positions so that the input current waveform into said rectifier circuit will closely approximate the voltage waveform into said rectifier input.

18. The method of claim 17 wherein the activation of said switching circuit has a substantially constant duty cycle between said first and second positions whereby the power factor is greater than 0.97 and the efficiency of the system is over 95%.

19. A power factor correction system of claim 16 further including a second capacitor circuit having a first and second terminals, said second capacitor circuit first terminal coupled to said full-wave rectifier and said second capacitor circuit second terminal coupled to said second terminal of said second inductor, a third capacitor circuit having a first and second terminal, said third capacitor circuit first terminal coupled to said second terminal of said second inductor and said third capacitor circuit second terminal coupled to said circuit common, a fourth capacitor circuit having a first and second terminal, said fourth capacitor circuit first terminal coupled to said second terminal of said second inductor, said fourth capacitor circuit having a second terminal coupled to said load.

20. A power factor correction system for improving the power factor and efficiency during transfer of power from an AC generator to a reactive, time-varying or non-linear load comprising:

a full-wave rectifier circuit for transforming an AC signal from the AC generator to a DC signal;

a load;

an inductive circuit having a first and second terminal, said inductive circuit first terminal coupled to said full-wave rectifier, said inductive circuit capable of storing energy from said full-wave rectifier circuit;

a capacitive circuit having a first and second terminal, said capacitive circuit first terminal coupled to said second terminal of said inductive circuit, said capacitive circuit second terminal coupled to said reactive load, said capacitive circuit capable of storing energy from said load;

a first diode having an anode coupled to said capacitive circuit first terminal, said diode having a cathode coupled to said second capacitive circuit second terminal, said diode allowing said capacitive circuit to store energy from said load;

a switch circuit having a first and second terminal, said first terminal of said switch coupled to said first terminal of said capacitive circuit and said second terminal of said inductive circuit, said second terminal of said switch coupled to circuit ground, said switch having at least two states, said first state causing said capacitive circuit to store energy from said load and said inductive circuit to store energy from said full-wave rectifier circuit, said second state causing said capacitive circuit and said inductive circuit to discharge energy into said reactive load; and a control circuit for providing the frequency and duty cycle of said switch states so that the input current waveform into said full-wave rectifier will approximate the voltage waveform into said rectifier input.

* * * * *